April 20, 1965    C. A. DEHNE    3,179,064
CONVEYOR SYSTEMS WITH INTERMITTENT CARRIER DRIVE
Filed March 18, 1963    3 Sheets-Sheet 3
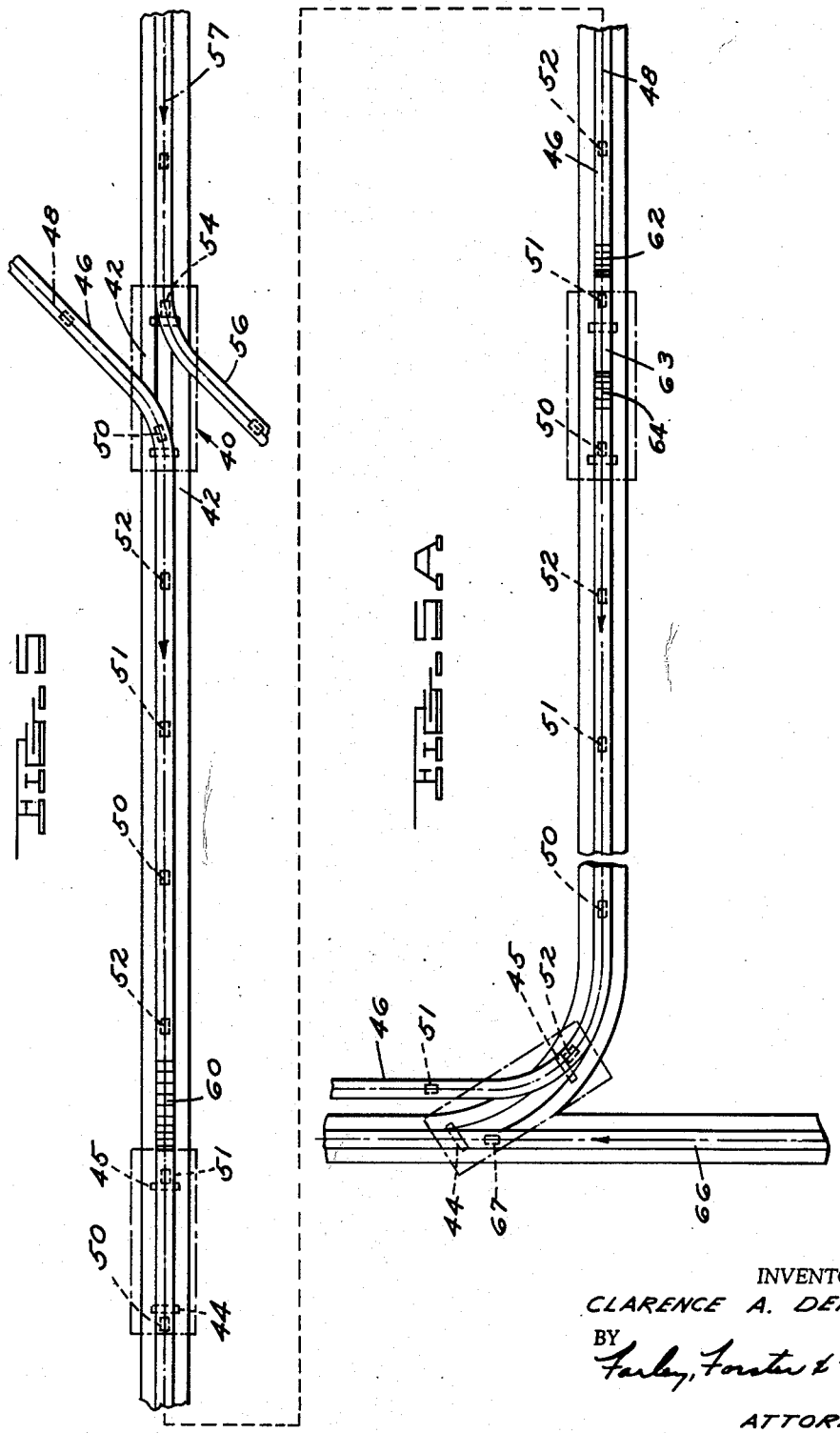
INVENTOR.
CLARENCE A. DEHNE
BY
Farley, Forster & Farley
ATTORNEYS

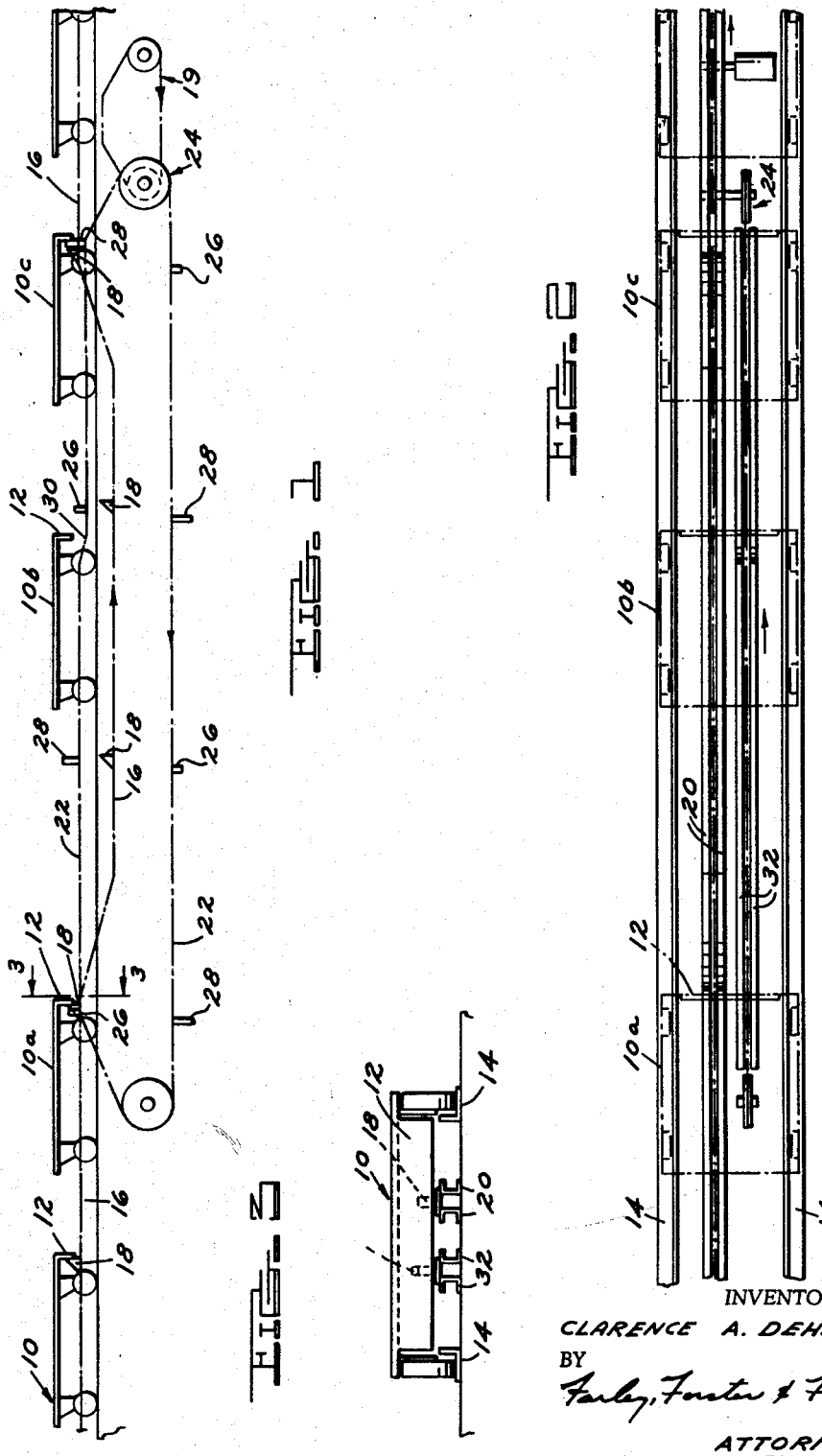

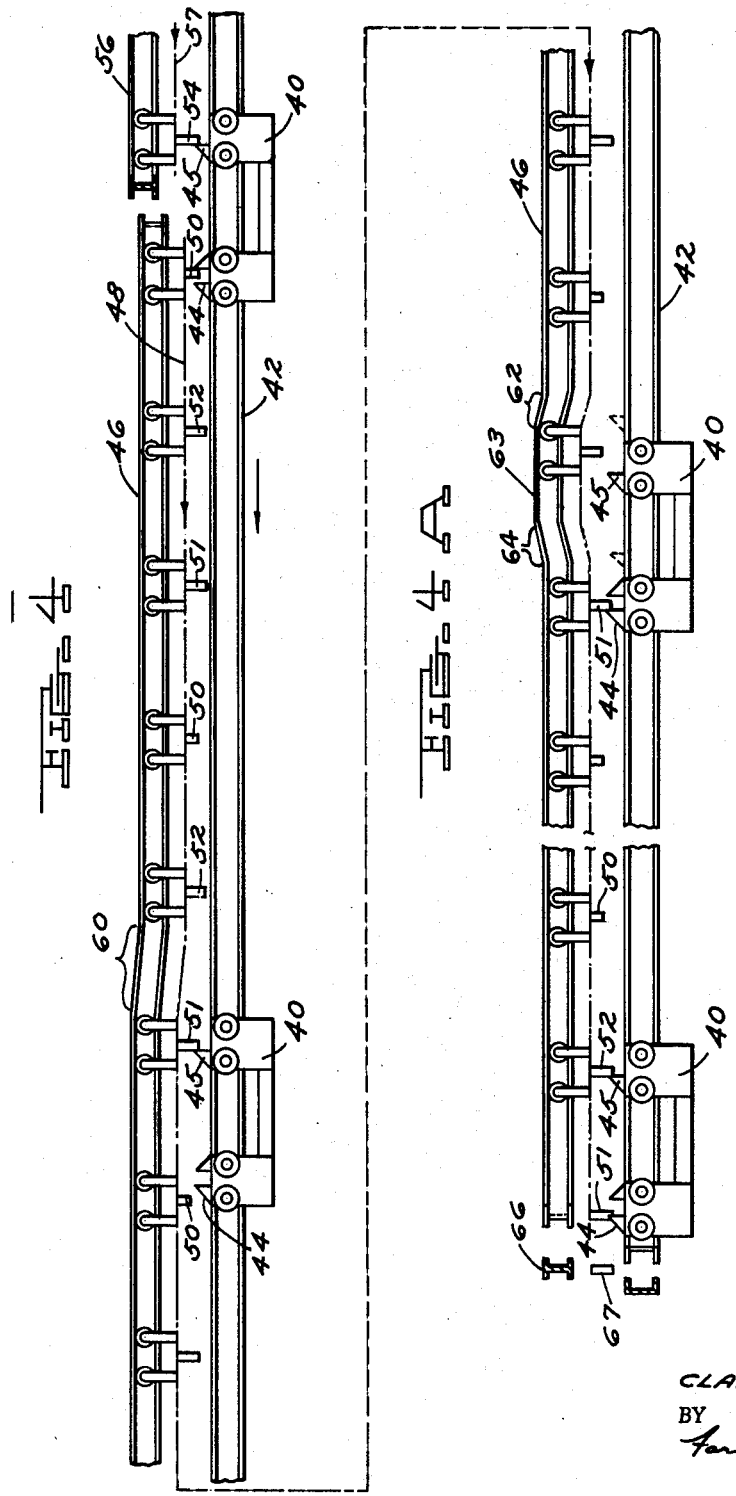

United States Patent Office 3,179,064
Patented Apr. 20, 1965

3,179,064
CONVEYOR SYSTEMS WITH INTERMITTENT
CARRIER DRIVE
Clarence A. Dehne, Garden City, Mich., assignor to
Jervis B. Webb Company, Detroit, Mich., a corporation
of Michigan
Filed Mar. 18, 1963, Ser. No. 265,710
8 Claims. (Cl. 104—172)

This invention relates to conveyor systems of the type where load carriers equipped with driven members are moved by engagement with pusher members mounted on an endless propelling member which is supported for travel in parallel spaced relation to the carriers and provides means which permits drive from the propelling member to a carrier to be momentarily interrupted without stopping and restarting the propelling member.

Conveyor systems of this general type include overhead power and free systems in which both the propelling member and carriers are supported on tracks, and floor truck tow line systems in which the propelling member is usually supported on a track either above or below the floor truck.

It is frequently desirable to stop each carrier at one or more points in a system in order to enable some operation to be performed—for example, to load or unload a carrier, and the general object of the present invention is to enable one or more stations to be provided in a conveyor system at which a carrier is momentarily stopped without interrupting motion of the endless propelling member.

According to the invention, a conveyor system of the type which includes carriers, supporting means along which the carriers travel, a power track adjacent to the carriers at a normal spaced relation, endless propelling means on the power track and pusher and driven members, the pusher members forming part of the propelling means and the driven members being mounted on the carriers, is characterized by the propelling means including primary and secondary pusher members, one of the secondary pusher members following one of the primary pusher members; the primary pusher members and carrier driven members being arranged for driving engagement at the normal spaced relation between the carriers and power track; a dwell station at which drive from the propelling means to a carrier is to be momentarily interrupted; a section immediately preceding the dwell station along which the spaced relation between the power track and carriers is increased an amount sufficient to disengage the primary pusher member from a carrier driven member; and the secondary pusher member being arranged for driving engagement with a carrier driven member at the increased spaced relation between the power track and carrier supporting means whereby drive to a carrier is resumed when a carrier driven member is overtaken by a following secondary pusher member.

In one embodiment of the invention the propelling means may consist of main and auxiliary propelling members, the auxiliary propelling member being driven in synchronism with the main propelling member at an increased rate of speed and carrying the primary and secondary pusher members; the dwell station being located along the secondary propelling member, and a transfer station is provided at which a carrier is engaged by a primary pusher member of the auxiliary propelling member and conveyed to the dwell station at the increased rate of speed.

Preferably the primary and secondary pusher members are arranged in repetitive groups including a primary pusher and at least one secondary pusher and in order to provide a dwell station the spacing between the propelling member and the carriers can be changed from a close spacing in which a carrier driven member is engageable by any pusher member of a group to an intermediate spacing in which a carrier driven member is engageable only by a secondary pusher member of a group to a wide spacing in which a carrier driven member is not engageable by any pusher member of a group. In another form of the invention a carrier may be provided with a leading driven member and a trailing driven member, the arrangement being such that drive to a carrier may be transferred between driven members at a dwell station.

The accompanying drawings, which disclose representative examples of both floor truck and overhead systems incorporating the invention, consist of the following views:

FIGURE 1, a schematic side elevation of a portion of a floor truck installation;

FIGURE 2, a plan view of the construction shown in FIG. 1;

FIGURE 3, a sectional elevation taken as indicated by the line 3—3 of FIG. 1;

FIGURE 4, a schematic side elevation of an overhead type of system;

FIGURE 4a, a continuation of FIG. 4; and

FIGURES 5 and 5a, respectively, plan views of the construction shown in FIGS. 4 and 4a.

In the system of FIGS. 1–3, load carriers in the form of floor trucks 10, each equipped with a depending driven member 12, are propelled along floor supported tracks 14 by a main propelling member 16 equipped with spaced upwardly projecting pushers 18. Motive power is supplied by a drive unit 19 and the path of chain travel is defined by a pair of channel members 20.

An auxiliary propelling member 22 is driven in synchronism with the main chain 16 from the drive unit 19 through a power take-off device 24, and in this instance the auxiliary chain 22 is driven at twice the speed of the main chain. Auxiliary chain 22 is equipped with alternate short or primary pusher members 26 and long or secondary pusher members 28, each long pusher trailing a short pusher.

The auxiliary chain 22 is employed in order to provide a station at which the floor trucks can be loaded or unloaded, and is driven at the faster speed so that additional time will be afforded for this operation. Transfer between the main propelling member 16 and auxiliary propelling member 22 takes place in the region of section 3—3 of FIG. 1. Auxiliary propelling member 22 is brought up to the level of the main chain 16 in advance of this location and the relative position of the pusher members on the respective chains is such that a floor truck 10a advanced to the transfer location by a pusher 18 on the main chain, is overtaken and picked up by a faster moving short pusher 26 of the auxiliary chain and advanced thereby to a dwell station at the location of the truck 10b where it is desired to stop the truck to enable the loading or unloading operation to be performed. Main chain 16 is displaced from its line of normal travel as shown, returning back to the normal line of travel at the re-transfer area where truck 10c is located.

Drive from the auxiliary chain 22 to a floor truck is momentarily interrupted by providing a section 30 immediately preceding the dwell station along which the spaced relation between the auxiliary chain track 32 and floor truck is increased an amount sufficient to disengage a short pusher member 26 from the driven member 12. Each secondary pusher member 28 is sufficiently long to engage the driven member 12 at the increased spaced relation so that drive to the floor truck is resumed when the driven member 12 is overtaken by the following secondary pusher 28. Truck 10c has been picked up in this manner and moved to the re-transfer area by a pusher 28 which then disengages leaving the truck to be picked up by an advancing pusher 18 of the main chain.

In the construction shown, intermittent carrier movement is obtained from a continuously moving propelling chain. By employing the auxiliary chain for this purpose, additional time is obtained when the carrier is stopped in a system where a relatively close spacing is desired between adjacent carriers in normal operation at other points in the system.

The overhead system shown in FIGS. 4, 4a, 5 and 5a, illustrates an application of the invention to an overhead power and free system and a manner in which multiple dwell stations can be provided along a single line. Carriers 40 are supported for travel on an overhead track 42 of opposed channel members and are equipped with upwardly projecting longitudinally spaced driven members 44 and 45. Dwell stations are desired along a power track 46 which supports an endless propelling member 48 having pusher members arranged in repetitive groups, each group including primary or leading short pusher 50 and a pair of secondary or trailing long pushers 51 and 52.

As shown at the right in FIG. 4, a carrier 40 is being delivered by a pusher 54 of a power track 56 to the power track 46, the propelling member 57 and pusher 54 of the forwarding track 56 being synchronized with the propelling member and groups of pushers of the power track 46 so that the leading drive member 44 of the carrier 40 is engaged by the primary pusher 50 of one of the groups of pushers. Power track 46 is positioned in close spacing to the carrier supporting track 42 so that the short pusher 50 is in driving relation with a carrier driven member and at this spacing a carrier driven member is engageable by any pusher member of a group. A first dwell station is defined by providing a rise section 60 in the power track 46 along which the spacing is changed from close to an increased intermediate spacing in which the primary or short pusher 50 disengages from the carrier driven member 44 thereby interrupting drive from the propelling member 48 to the carrier.

Dive is resumed when the trailing driven member 45 of the carrier is overtaken by the secondary pusher 51 of a group and carrier movement continues until a second dwell station shown in FIGS. 4a and 5a is reached. This station is preceded by a rise section 62 in the power track 46 along which the spacing between the power track and the carrier is increased to a wide spacing along section 63 so as to disengage secondary pusher 51 from the trailing carrier driven member 45 thereby interrupting drive to the carrier. At the end of section 63, a drop section 64 returns track 46 back from the wide spacing to the intermediate spacing. The length of section 63 is less than the distance between the front and rear carrier driven members 44 and 45 so that drive to the carrier is resumed when pusher 51 returns to the same spaced relation and engages the leading carrier driven member 44.

Each carrier is next transferred from power track 46 to power track 66 having pushers 67. During this transfer the long pusher 51 of power track 46 disengages from the leading carrier driven member 44 as the path of the power track diverges from the path of the carrier supporting track 42. The trailing carrier driven member 45 is then picked up by the following long pusher 52 which advances the carrier into position where the leading driven member 44 can be engaged by an approaching pusher 67 on power track 66 as shown in FIG. 5a, it being understood that the propelling member of power track 46 and the propelling member of power track 66 are synchronized so that the relative position between their respective pushers is established.

The foregoing is intended as illustrative of possible conveyor systems in which drive to a carrier can be interrupted so that motion of the carrier can be stopped without the necessity of starting and stopping the propelling member. Modifications to the systems disclosed which fall within the scope of the following claims are to be considered a part of the present invention.

I claim:
1. A conveyor system of the type including carriers, supporting means along which the carriers travel, a power track adjacent to the carriers at a normal spaced relation, endless propelling means on the power track, and pusher and driven members, the pusher members forming part of the propelling means and the driven members being mounted on the carriers; characterized by
 (a) said propelling means including primary and secondary pusher members, one of said secondary pusher members following one of said primary pusher members;
 (b) said primary pusher members and carrier driven members being arranged for driving engagement at said normal spaced relation between the carriers and power track;
 (c) said secondary pusher members and carrier driven members being arranged for driving engagement at a greater spacing between the carriers and power track, at which greater spacing said primary pusher and carrier driven members are non-engageable;
 (d) and means for changing said spacing from normal to greater whereby drive from said propelling means to a carrier driven member engaged by a primary pusher member is disengaged and carrier travel interrupted until said carrier driven member is engaged by a following secondary pusher member.

2. A conveyor system of the type including carriers, supporting means along which the carriers travel, a power track adjacent to the carriers at a normal spaced relation, endless propelling means on the power track, and pusher and driven members, the pusher members forming part of the propelling means and the driven members being mounted on the carriers; characterized by
 (a) said propelling means including primary and secondary pusher members, one of said secondary pusher members following one of said primary pusher members;
 (b) said primary pusher members and carrier driven members being arranged for driving engagement at said normal spaced relation between the carriers and power track;
 (c) a dwell station at which drive from the propelling means to a carrier is to be momentarily interrupted;
 (d) a section immediately preceding said dwell station along which the spaced relation between said power track and carriers is increased an amount sufficient to disengage said primary pusher member from said carrier driven member; and
 (e) said secondary pusher member being arranged for driving engagement with a carrier driven member at said increased spaced relation between said power track and carrier supporting means whereby drive is resumed when a carrier driven member is overtaken by a following secondary pusher member.

3. A conveyor system according to claim 2 wherein said propelling means includes main and auxiliary propelling members, the auxiliary propelling member carrying said primary and secondary pusher members and said dwell station being located along the auxiliary propelling member; means for driving the auxiliary propelling member in synchronism with the main propelling member, and a transfer station at which a carrier driven member is engaged by a primary pusher of the auxiliary propelling member and conveyed thereby to the dwell station.

4. A conveyor system according to claim 3 further characterized by a re-transfer station at which a carrier driven member is disengaged from a secondary pusher of the auxiliary propelling member and re-engaged by a pusher of the main propelling member.

5. A conveyor system according to claim 3 wherein said propelling means moves the auxiliary propelling member at a speed greater than that of the main propelling member.

6. A material handling system of the type employing driven and pusher members, the driven members being mounted on load carriers, the pusher members being mounted on an endless propelling member supported for travel in parallel spaced relation to the carriers, characterized by (a) said pusher members being arranged in spaced relation along said propelling member in repetitive groups, each group including a short pusher and a long pusher trailing the short pusher, (b) and means for changing the spacing between the propelling members and carriers an amount sufficient to position said short pusher in non-driving relation with a carrier driven member whereby drive from the propelling member to a carrier can be interrupted and transferred from a short pusher member to a trailing long pusher.

7. A material handling system of the type employing driven and pusher members, the driven members being mounted on load carriers, the pusher members being mounted on an endless propelling member supported for travel in parallel spaced relation to the carriers, characterized by said pusher members being arranged in spaced relation along said propelling member in repetitive groups, each group including a short pusher member and a long pusher member trailing the short pusher member, and means for changing the spacing between the propelling member and carriers from a close spacing in which a carrier driven member is engageable by any pusher member of a group to an intermediate spacing in which a carrier driven member is engageable only by a long pusher member of a group to a wide spacing in which a carrier driven member is not engageable by any pusher member of a group.

8. A material handling system according to claim 7 further characterized by each carrier being provided with a leading main driven member and a trailing supplemental driven member and wherein the length along which the propelling member and carrier are arranged at said wide spacing does not exceed the distance between said main and supplemental driven members.

References Cited in the file of this patent

UNITED STATES PATENTS

| | | |
|---|---|---|
| 2,918,021 | Burrows | Dec. 22, 1959 |
| 3,021,796 | Parshall et al. | Feb. 20, 1962 |
| 3,048,125 | Burrows | Aug. 7, 1962 |
| 3,088,419 | Bishop | May 7, 1963 |